(12) United States Patent
Wu

(10) Patent No.: US 11,991,596 B2
(45) Date of Patent: May 21, 2024

(54) POSITIONING RESOURCE MEASUREMENT FEEDBACK IN WIRELESS COMMUNICATION SYSTEM

(71) Applicant: Kingstar Technologies, Inc., San Diego, CA (US)

(72) Inventor: Huaming Wu, San Diego, CA (US)

(73) Assignee: KINGSTAR TECHNOLOGIES, INC., San Diego, CA (US)

( * ) Notice: Subject to any disclaimer, the term of this patent is extended or adjusted under 35 U.S.C. 154(b) by 60 days.

(21) Appl. No.: 17/745,223

(22) Filed: May 16, 2022

(65) Prior Publication Data

US 2022/0272495 A1 Aug. 25, 2022

Related U.S. Application Data

(63) Continuation of application No. 16/891,840, filed on Jun. 3, 2020, now Pat. No. 11,337,033.

(60) Provisional application No. 62/872,556, filed on Jul. 10, 2019.

(51) Int. Cl.
*H04W 4/029* (2018.01)
*G01S 5/10* (2006.01)

(52) U.S. Cl.
CPC ............... *H04W 4/029* (2018.02); *G01S 5/10* (2013.01); *G01S 2205/008* (2013.01)

(58) Field of Classification Search
CPC ........... H04W 4/029; H04W 4/70; G01S 5/10; G01S 2205/008; G01S 5/0036
USPC ...................................................... 455/456.1
See application file for complete search history.

(56) References Cited

U.S. PATENT DOCUMENTS

| 2013/0065612 A1* | 3/2013 | Siomina .............. H04B 7/024 455/456.2 |
| 2014/0057664 A1* | 2/2014 | Pei ...................... G01S 5/0236 455/456.5 |
| 2017/0289947 A1 | 10/2017 | Zaidi et al. |
| 2017/0339516 A1 | 11/2017 | Edge et al. |
| 2018/0049151 A1 | 2/2018 | Yoon |
| 2019/0049550 A1 | 2/2019 | Modarres Razavi et al. |

OTHER PUBLICATIONS

Non-Final Office Action received for U.S. Appl. No. 16/891,840 dated Jul. 22, 2021, 26 pages.
International Search Report and Written Opinion received for PCT Application Serial No. PCT/US2020/036663 dated Sep. 11, 2020, 12 pages.
International Preliminary Report on Patentability received for PCT Application Serial No. PCT/US2020/036663 dated Jan. 20, 2022, 9 pages.

* cited by examiner

*Primary Examiner* — Huy C Ho
(74) *Attorney, Agent, or Firm* — Amin, Turocy & Watson, LLP

(57) ABSTRACT

In various aspects, a system that comprises requesting a positioning measurement data set from one or more network node devices; receiving a positioning measurement data set, determining a time of arrival value for each positioning measurement data of the positioning measurement data set; generating a positioning measurement report comprising a group of positioning measurement report elements determined as having fulfilled a predetermined criterion; and transmitting the positioning measurement report, wherein the positioning measurement report comprises a first portion and a second portion.

20 Claims, 14 Drawing Sheets

| 1 | 1 | 1 | RSTD$_{1,2}$ | RSTD$_{2,1}$ | RSTD$_{3,1}$ | RSTD$_{4,1}$ |

| RSTD$_{2,1}$ | RSTD$_{3,1}$ | RSTD$_{4,1}$ |

| 0 | 1 | 1 | RSTD$_{1,2}$ | RSTD$_{1,3}$ | RSTD$_{1,4}$ | RSTD$_{2,1}$ | RSTD$_{3,1}$ | RSTD$_{4,1}$ |

| 0 | 1 | 1 | 1 | 0 | 1 | RSTD$_{1,2}$ | RSTD$_{1,4}$ | RSTD$_{2,1}$ | RSTD$_{3,1}$ | RSTD$_{4,1}$ |

POSITIONING RESOURCE MEASUREMENT FEEDBACK IN WIRELESS COMMUNICATION SYSTEM

RELATED APPLICATION

The subject patent application is a continuation of and claims priority to U.S. patent application Ser. No. 16/891,840, filed Jun. 3, 2020, entitled "POSITIONING RESOURCE MEASUREMENT FEEDBACK IN WIRELESS COMMUNICATION SYSTEM," which claims priority to U.S. Provisional Patent Application No. 62/872,556, filed Jul. 10, 2019, entitled "POSITIONING RESOURCE MEASUREMENT FEEDBACK IN WIRELESS COMMUNICATION SYSTEM"; the entireties of these applications are incorporated herein by reference.

TECHNICAL FIELD

This disclosure relates generally to location identification of a communication device utilizing a positioning resource measurement feedback in a wireless communication system. More specifically, facilitating generation of the positioning resource measurement feedback utilizing minimum resources.

BACKGROUND

Several techniques are utilized to locate a user equipment (UE) operating in a wireless network. One such technique is to use terrestrial radio location technique, which is based on collection of positioning and time of arrival measurements collected by UE of signals transmitted by wireless network base stations and/or based on measurements made by network elements (e.g., base stations) of signals transmitted by the UE. The UE is requested to these measurements from one or more base stations. Upon collecting these measurements, the UE generates a measurement feedback to the network for determining UE's position. Depending on number of base stations used to collect measurements, the feedback can take up large number of resources.

The above-described background relating to collecting positioning and time of arrival measurements for calculating UE's position is merely intended to provide a contextual overview of some current issues, and is not intended to be exhaustive (e.g., although problems and solution are directed to next generation networks such as 5G, the solutions can be applied to 4G/LTE technologies). Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 5A illustrates a non-limiting examples of report configurations utilized for providing feedback positioning measurements in accordance with various aspects and embodiments of the subject disclosure.

FIG. 5B illustrates a non-limiting examples of report configurations utilized for providing feedback positioning measurements in accordance with various aspects and embodiments of the subject disclosure.

FIG. 5C illustrates a non-limiting examples of report configurations utilized for providing feedback positioning measurements in accordance with various aspects and embodiments of the subject disclosure.

FIG. 5D illustrates a non-limiting examples of report configurations utilized for providing feedback positioning measurements in accordance with various aspects and embodiments of the subject disclosure.

DETAILED DESCRIPTION

Figure 1:
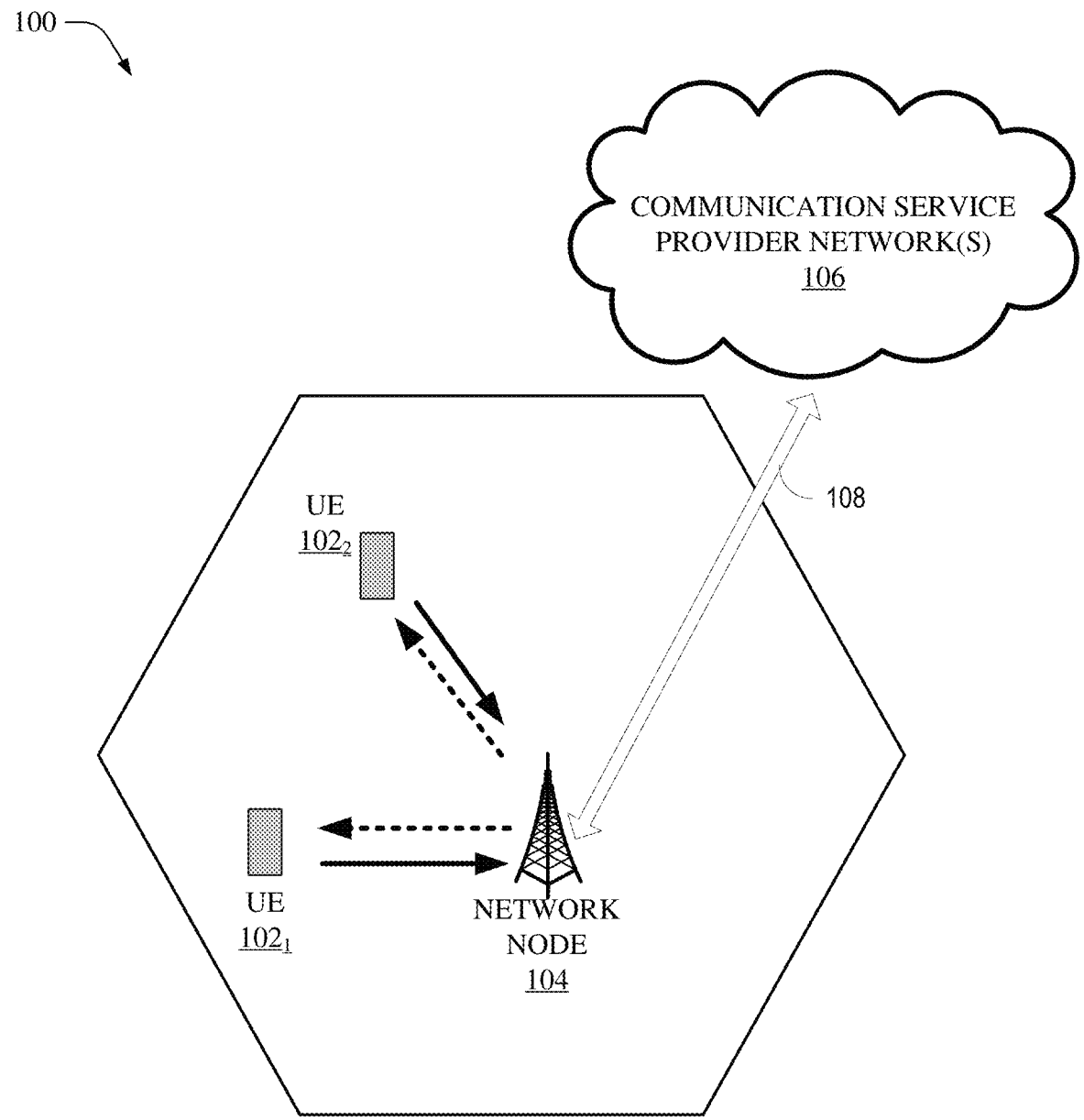
FIG. 1 illustrates an example wireless communication system in which a network node device and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate generation of the positioning resource measurement feedback utilizing minimum resources. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long-Term Evolution (LTE), or other next generation networks, the disclosed aspects are not limited to 5G, a UMTS implementation, and/or an LTE implementation as the techniques can also be applied in 3G, 4G or other LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate generation of the positioning resource measurement feedback utilizing minimum resources. Facilitating generation of the positioning resource measurement feedback can be implemented in connection with any type of device with a connection to the communications network (e.g., a communication device, a mobile handset, a computer, a handheld device, etc.) any Internet of Things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi -carrier" transmission and/or reception.

In some embodiments the non-limiting term radio, network node device, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, evolved Node B (eNB or eNodeB), next generation Node B (gNB or gNodeB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network.

Certain embodiments of this disclosure can comprise an SDN controller (e.g., controller, central controller, or centralized unit) that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

According to an embodiment, a system can comprise a processor and a memory that stores executable instructions that, when executed by the processor, facilitate performance of operations comprising requesting a positioning measurement data set from one or more network node devices. The system can further comprise receiving the positioning measurement data set from the one or more network node devices, in response the receiving the positioning measurement data set, determining a time of arrival value for each positioning measurement data of the positioning measurement data set, generating a positioning measurement report comprising a group of positioning measurement report elements determined as having the time of arrival value satisfying a threshold value, and transmitting the positioning measurement report, wherein the positioning measurement report comprises a first portion and a second portion.

According to another embodiment, described herein is a method that can comprise requesting a positioning measurement data set from one or more network node devices. The method can further comprise receiving the positioning measurement data set from the one or more network node devices, in response the receiving the positioning measurement data set, determining a time of arrival value for each positioning measurement data of the positioning measurement data set, generating a positioning measurement report comprising a group of positioning measurement report elements determined as having the time of arrival value satisfying a threshold value, and transmitting the positioning measurement report, wherein the positioning measurement report comprises a first portion and a second portion.

According to yet another embodiment, a device can comprise a processor and a memory that stores executable instructions that, when executed by the processor, facilitate performance of operations comprising requesting a positioning measurement data set from one or more network node devices. The device can further comprise receiving the positioning measurement data set from the one or more network node devices, in response the receiving the positioning measurement data set, determining a time of arrival value for each positioning measurement data of the positioning measurement data set, generating a positioning measurement report comprising a group of positioning measurement report elements determined as having the time of arrival value satisfying a threshold value, and transmitting the positioning measurement report, wherein the positioning measurement report comprises a first portion and a second portion.

These and other embodiments or implementations are described in more detail below with reference to the drawings. Repetitive description of like elements employed in the figures and other embodiments described herein is omitted for sake of brevity.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or include a large-scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi -carrier operation", "multi -carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

In LTE, LTE-5G or LTE new radio (NR), to locate a UE geographically, there are several approaches network or UE can utilize. One is to use some form of terrestrial radio location based on measurements made by a UE of signals transmitted by wireless network base stations and/or based on measurements made by network elements (e.g., base stations) of signals transmitted by the UE. Another approach is to use a Global Positioning System (GPS) receiver or Global Navigation Satellite System (GNSS) receiver built into the UE itself.

Figure 2:
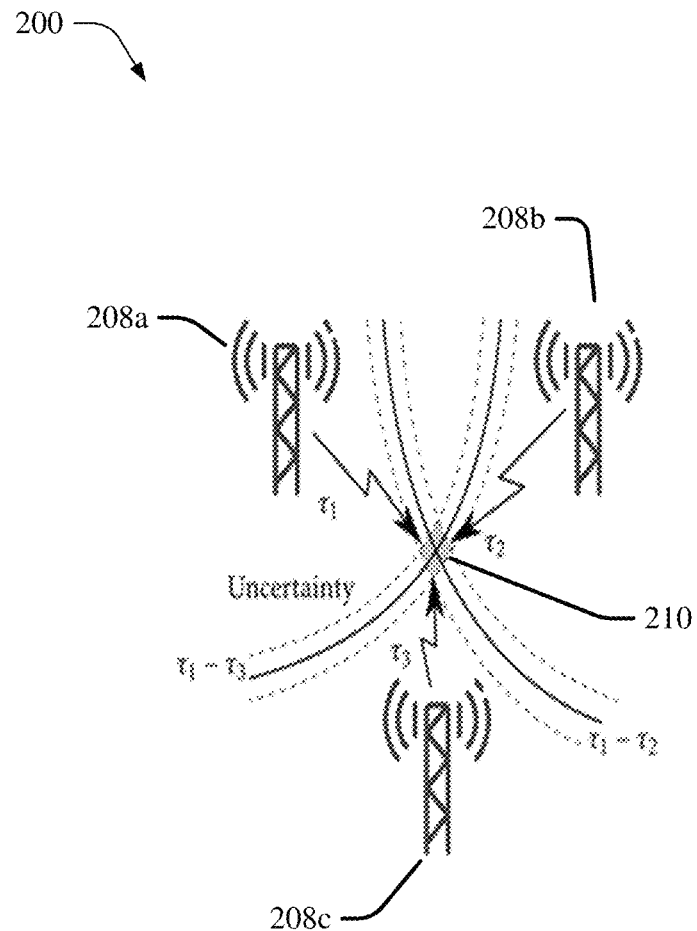
FIG. 2 illustrates a non-limiting example of a wireless communication system that utilizes terrestrial radio location method in accordance with one or more embodiments described herein.

FIG. 2 illustrates a non-limiting example of a wireless communication system 200 that utilizes terrestrial radio location method in accordance with various aspects and embodiments of the subject disclosure. According to an embodiment, an observed time difference of arrival (OT-DOA) positioning method that is a multiliterate method is illustrated. The UE 210 measures three time of arrivals (TOA) of the specific positioning reference signals (PRS) transmitted from a plurality of base stations 208$a$-$c$ relative to the UE 210 internal time base, $\tau_1$, $\tau_2$ and $\tau_3$. The measurement $T_1$ is selected as the reference, and two OTDOA's are formed: $t_{1,2}=\tau_1-\tau_2$ and $\tau_{1,3}32\ \tau_1-\tau_3$. The UE 210 reports the OTDOA also known as the reference signal time difference (RSTD) measurement to the serving base station (e.g., base station 208$a$), which then forwards the UE 210 reports to an enhanced serving mobile location center (E-SMLC) or to a secure user plane location (SUPL) location platform (SLP). Then, the measured time differences and knowledge of the base stations' locations and relative transmission timings are used (e.g., at the E-SMLC) to calculate the UE's position. Note that in LTE, the RSTD measurement report unit is Ts (the basic time unit in LTE, which is defined as Ts=1/(15000×2048) seconds).

Figure 3:
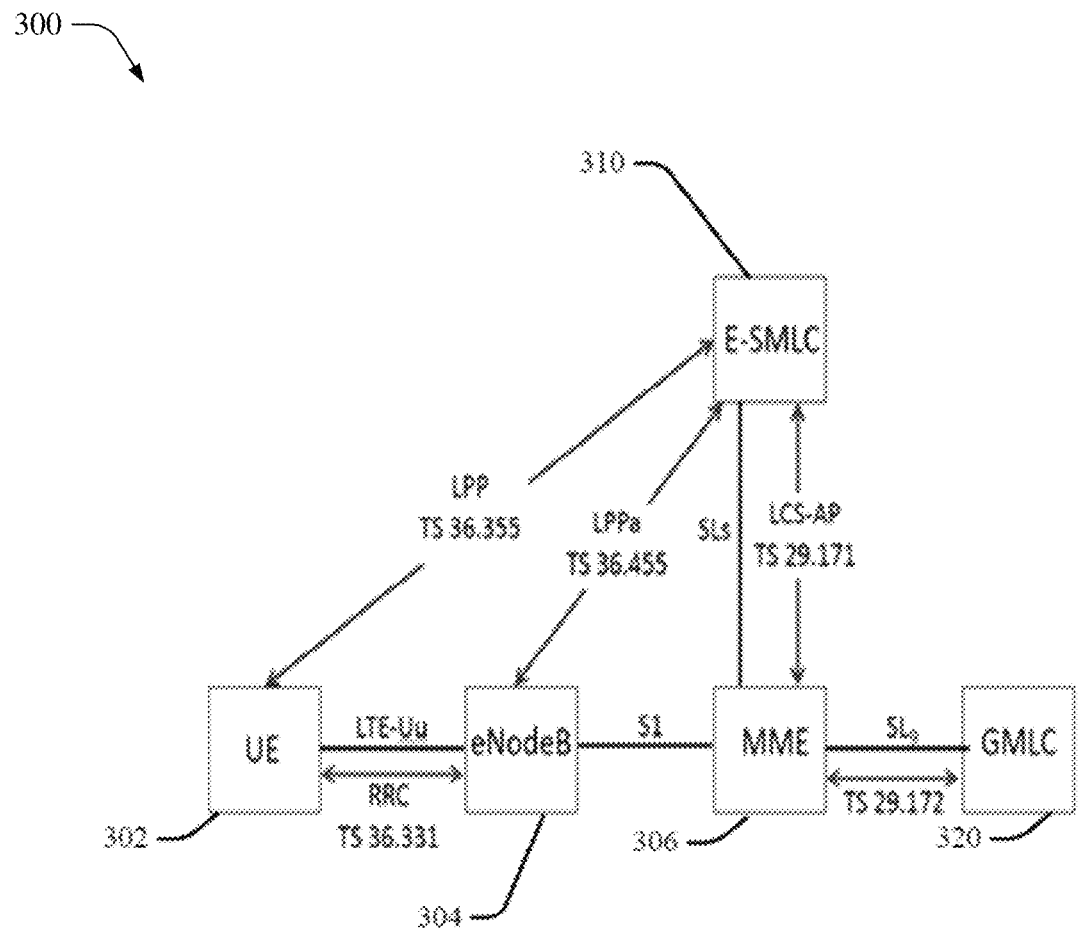
FIG. 3 illustrates a non-limiting example of a positioning architecture defined by LTE. A typical positioning signaling flow is defined herein.

FIG. 3 illustrates a non-limiting example of a positioning architecture defined by LTE. A typical positioning signaling flow is defined herein. First, the mobility management entity (MME) initiates a location service or receives a location service request from the UE 302 or gateway mobile location center (GMLC) 320. GMLC 320 is the first node with which an external location based services (LBS) client communicates. Second, the MME sends a positioning request to the location server, E-SMLC 310. The E-SMLC 310 processes the request, communicates with the UE 302, and requests for RSTD measurements. Upon receiving RSTD measurements from the UE 302, the E-SMLC 310 estimates the UE's 302 position and sends the result back to the MME 306. The MME 306 may further forward the result to the UE 302 or GMLC 320 as appropriate.

The signaling between the E-SMLC 310 and UE 302 is carried out via the LTE positioning protocol (LPP). Moreover, there are also interactions between the E-SMLC and evolved Node B (eNB) via the LPP A (LPPa) protocol, supported by the interactions between the eNB 304 and UE 302 via the radio resource control (RRC) protocol. The LPP positioning procedures comprise following steps.

1) Capability transfer: The E-SMLC 310 sends an OTDO-ARequestCapabilities message to the UE 302, and the UE 302 responds with a ProvideCapabilities message to the ESMLC 310. Example capabilities include supported frequency bands and inter-frequency RSTD measurements support.

2) Assistance data transfer: The E-SMLC 310 sends a ProvdieAssistanceData message to the UE 302. This message contains the information of the specific PRS configuration of the suggested reference and neighbor cell list. With the assistance data, the UE 302 knows when the PRS signals are transmitted and can measure TOA based on the PRS signals accordingly.

3) Location information transfer: The E-SMLC 310 sends a RequestLocationInformation message to the UE 302, and the UE 302 responds with a ProvideLocationInformation message to the E-SMLC 310 within a certain response time. The ProvideLocationInformation message includes the UE's 310 RSTD measurement results.

Figure 4:
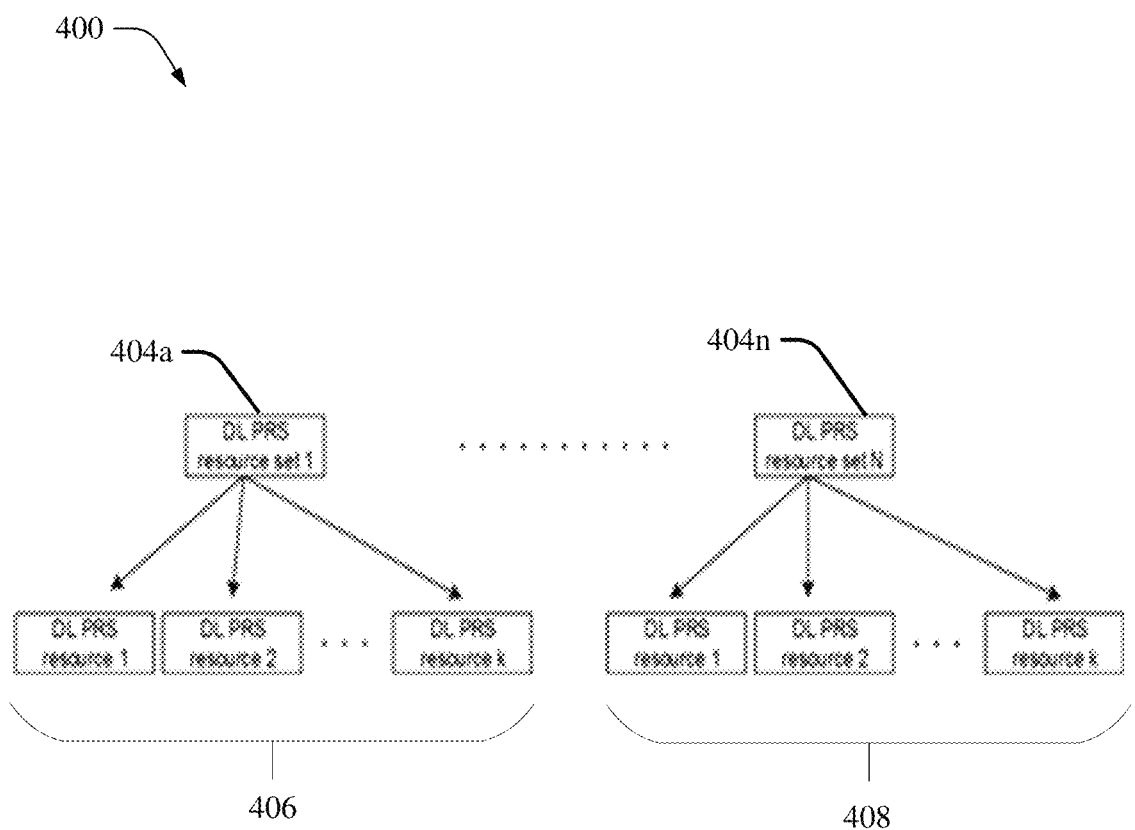
FIG. 4 illustrates a non-limiting example of new radio wireless communication system that utilizes downlink PRS resource set configuration in accordance with various aspects and embodiments of the subject disclosure.

FIG. 4 illustrates a non-limiting example of new radio wireless communication system 400 that utilizes downlink PRS resource set configuration in accordance with various aspects and embodiments of the subject disclosure. In some embodiments, positioning according to NR, similar to LTE, OTDOA can be used in other wireless communication system such as 5G-NR (e.g., LTE-NR). Positioning in NR is expected to have higher accuracy with wider bandwidth of PRS and support beamforming of PRS where the signal quality of PRS can be improved.

In order to support beamforming of PRS transmission, a DL PRS Resource Set 404a-n is defined as a set of DL PRS Resources 406 and 408, respectively, where each DL PRS Resource has a DL PRS Resource ID. Note that a DL PRS Resource ID in a DL PRS Resource set 406 is associated with a single beam transmitted from a single transmission and reception point (TRP) (e.g., a TRP may transmit one or more beams). In other words, a DL PRS resource set 406 corresponds to all beams transmitted from a single TRP. A UE 302 is configured with N DL PRS resource sets 404a-n where each DL PRS resource set contains k DL PRS resources 406 and 408.

Due to the support of PRS beamforming in NR, when configured with multiple DL PRS resource sets, the UE 302 is expected to measure and report RSTD for each DL PRS resource in all of the DL PRS resource sets. However, transmitting such resource-level measurement feedback may utilize unnecessary transmission resource when some of the resource-level RSTD measurements are the same or very similar given that they are measurements for the DL PRS transmission from the same TRP.

For simplicity the following notations are used herein to describe the methods used according to some embodiments to facilitate efficient provide measurement feedback.

N: the total number of configured DL PRS sets for a UE;

n: the nth DL PRS set, $1<=n<=N$;

$K_n$: the number of DL PRS resources in the nth DL PRS resource set. Note that it is not necessary to have the same number of PRS resources for each set;

$k_n$: the kth DL PRS resource in the nth DL PRS resource set, $1<=k_n<=K_n$;

$r_n$: the rth DL PRS resource in the nth DL PRS resource set which is selected as the reference when calculate RSTD. $r_n$ may or may not be the same for all n; and $RSTD_{n,k}$: the RSTD (e.g. TOA difference) between the kth DL PRS resource in the nth DL PRS resource set and that of the reference DL PRS resource.

According to an embodiment, there are $K_1-1$ RSTD values needed to be reported for PRS resource set 1, and so on, the total RSTD values to be reported for all the configured PRS resources will be $\Sigma_{i=1}^{N}(K_i-1)$ as shown in the following table 1.

TABLE 1

| RSTD for PRS resource set | | |
|---|---|---|
| PRS resource set 1 | ... | PRS resource set N |
| $RSTD_{1,1}$ | ... | $RSTD_{N,1}$ |
| ... | ... | ... |
| $RSTD_{1,r-1}$ | ... | $RSTD_{N,r-1}$ |
| $RSTD_{1,r+1}$ | ... | $RSTD_{N,r+1}$ |
| ... | ... | ... |
| $RSTD_{1,K1}$ | ... | $RSTD_{N,KN-1}$ |
| | ... | $RSTD_{N,KN}$ |

The UE can generate some indication (e.g., string or bitmap) along with RSTD reports to save some reporting overhead. For this purpose, the UE and/or the network may select the reference PRS resource and/or PRS resource set accordingly in order for the UE to save reporting overhead. Furthermore, when the UE selects a different reference PRS resource other than the one from the network positioning configuration, the UE reports the actual used PRS resource index to the network.

FIG. 5A-5D illustrates a non-limiting examples of report configurations 500, 510, 520, and 530 utilized for providing feedback positioning measurements in accordance with various aspects and embodiments of the subject disclosure. According to an embodiment, different PRS resources in the same set are typically corresponding to different beams transmitted from the same TRP. The RSTD values for beams transmitted from the same TRP (e.g., the same PRS resource set) should be the same or with very small difference (e.g., smaller than the RSTD report granularity unit Ts) if all PRS resources corresponding to the same set are transmitted simultaneously and received by the same UE even when taken the following factors into account: LOS or NLOS channel between the transmitter and the receiver due to reflection of signals caused by the environment and the different direction of different beams; and measurement estimation error.

As an example, 4 TRPs may each transmit 4 PRS resources corresponding to 4 beams simultaneously. A UE may receive and measure all 4 beams for each TRP. For simplicity, it is assumed PRS resource 1 in the PRS resource set 1 is the reference PRS resource for RSTD calculation for all sets. Then there are total 12 RSTD values.

For example, in an indoor positioning scenario, RSTD values corresponding to the same set can be very close (e.g., difference of RSTD values <=a threshold 0). Then the UE can generate a bitmap where a bit of value '1' indicating that the RSTD reporting is for PRS set level as shown in 500 FIG. 5A. For example, $RSTD_{1,2}-RSTD_{1,3}<=\theta$ or $RSTD_{1,3}-RSTD_{1,2}<=\theta$; $RSTD_{1,2}-RSTD_{1,4}<=\theta$ or $RSTD_{1,4}-RSTD_{1,2}<=\theta$; $RSTD_{1,3}-RSTD_{1,4}<=\theta$ or $RSTD_{1,4}-RSTD_{1,3}<=\theta$. And so, for other PRS resource sets. Thus, instead of feedbacking 12 RSTD values, the UE can feedback 4 bits plus 4 RSTD values to save reporting overhead.

In some embodiments, RSTD values can be compared against another threshold e.g., instead of difference of two RSTD values, the absolute RSTD value <=a threshold Then the UE can choose not to report any RSTD values corresponding to the PRS set where the reference PRS resource belongs to. For other PRS sets, the UE can select a subset of RSTD to report. Report those RSTD values which are larger than η or choose only one RSTD if all RSTD values are smaller than or equal to the threshold η. For example, $RSTD_{1,2}<=RSTD_{1,3}<=\eta$ and $RSTD_{1,4}<=\eta$; all RSTD values for PRS resource set 2, 3, and 4 are $<=\eta$. The report of the UE is as shown in 510 FIG. 5B. Given the size of RSTD report is fixed and known by the network, there's no ambiguity for the network to tell whether this format or the one used by the UE in FIG. 5A.

In case the RSTD values corresponding to the same set are not close by (e.g., difference >a threshold θ) for some PRS resource set(s). Then the UE can also generate a bitmap where a bit of value '0' indicating that the RSTD reporting for that PRS set is not set level. FIG. 5C (e.g., report 520) illustrates an example where the 1$^{st}$ bit of value '0' is corresponding to the 1$^{st}$ PRS resource set indicating that RSTD values for the 1$^{st}$ PRS resource set are not at the set level. In this case, 3 RSTD values corresponding to the 1$^{st}$ PRS resource set and 3 RSTD values corresponding to other 3 PRS resource sets are reported together.

In another example, the bit string contains two parts: the first 4 bits indicating whether the corresponding RSTD reports are at set level ('1') or not ('0'). In case the bit in the first part is of value '0', then there will be the second part where a bit in the second part indicating whether the corresponding RSTD report is the same (e.g., difference <=a threshold θ) as the previous RSTD report corresponding to the same PRS resource set. For example, FIG. 5D (e.g., report 530) illustrates an extended example of FIG. 6 where $RSTD_{1,2}$ and $RSTD_{1,3}$ are the same corresponding to the 1$^{st}$ PRS resource set. The first 4 bits (the first part) are corresponding to PRS resource set 1 to 4 in order. Since the first bit is of value '0', then the 5$^{th}$ to 7$^{th}$ bit (e.g., the second part) are corresponding to PRS resource set 1 where the bit string of '101' indicating $RSTD_{1,3}$ is the same as $RSTD_{1,2}$ so that only two RSTD reports for PRS resource set 1 is needed together with RSTD reports for PRS resource set 2, 3 and 4.

Note that the threshold θ and/or η for RSTD report value comparison can be indicated or pre-configured by the network or chosen by the UE. For example, for the RSTD report unit of Ts, half Ts (e.g., difference of RSTD<=±0.5 Ts) may be selected as the threshold θ and/or η.

Note that an RSTD report may contain more than 10 bits (e.g., a single RSTD report in LTE is 14 bit), a bitmap (with one or two parts) indicating whether set level obviously saves the reporting overhead.

Figure 6A:
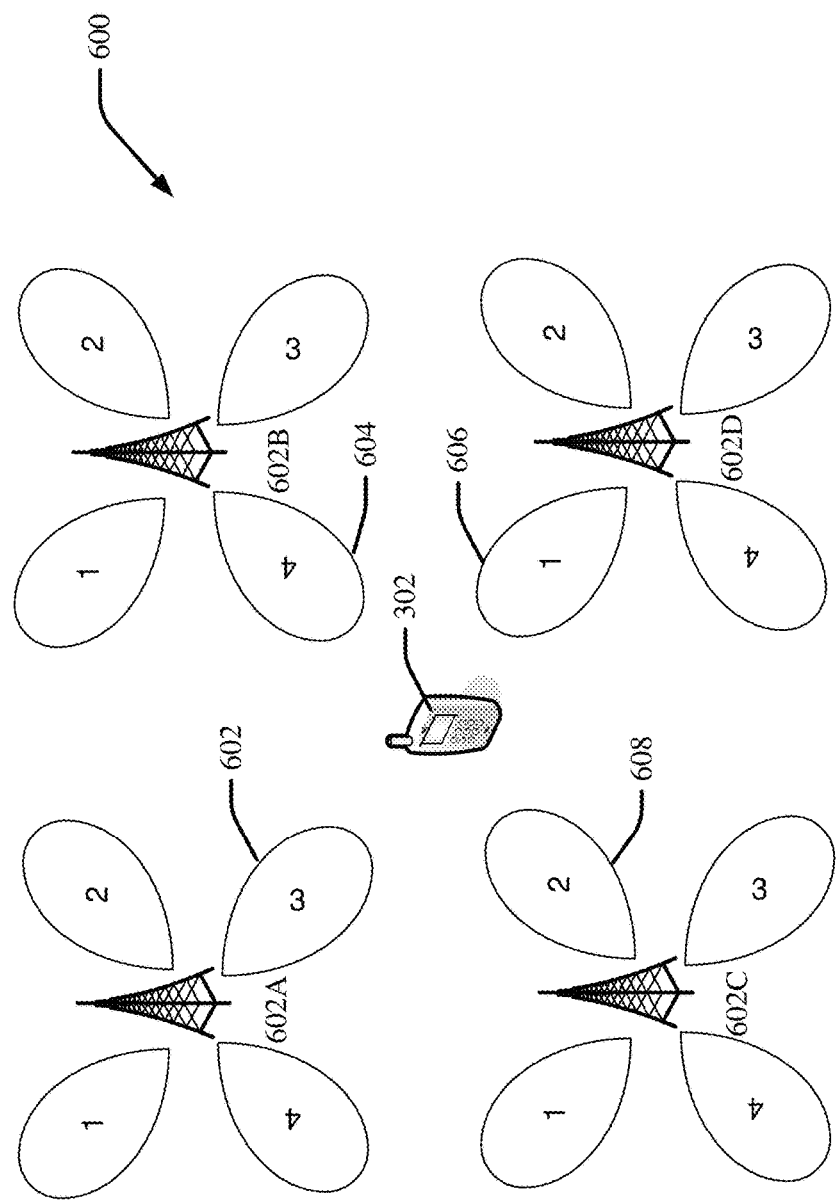
FIG. 6A illustrates a non-limiting example of TRP configuration in accordance with various aspects and embodiments of the subject disclosure.
Figure 6B:
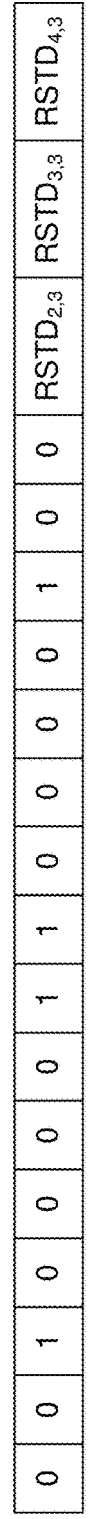
FIG. 6B illustrates a non-limiting example of a report configuration utilized for providing feedback positioning measurements in accordance with various aspects and embodiments of the subject disclosure.

FIG. 6A illustrates a non-limiting example of TRP configuration 600 and FIG. 6B illustrates a non-limiting example of a report configuration 650 utilized for providing feedback positioning measurements in accordance with various aspects and embodiments of the subject disclosure. According to an embodiment, for example, assume 4 TRPs, each may transmit 4 PRS resources corresponding to 4 beams. The UE is able to receive and measure only a subset of PRS resources from any TRP due to for example, the narrow direction of beamforming. For example, the UE 302 in FIG. 6A can only receive and measure beam 3 602 from gNB 1 602A, beam 4 604 from gNB2 604B, beam 1 606 from gNB3 604D and beam 2 608 from gNB4 604C. The reference PRS resource is selected as beam 3 602 from gNB1 602A.

As illustrated, FIG. 6B gives the RSTD reports along with a 16-bit bitmap where each bit represents whether a measurement result on the corresponding PRS resource is obtained or not.

Figures 7A, 7B:
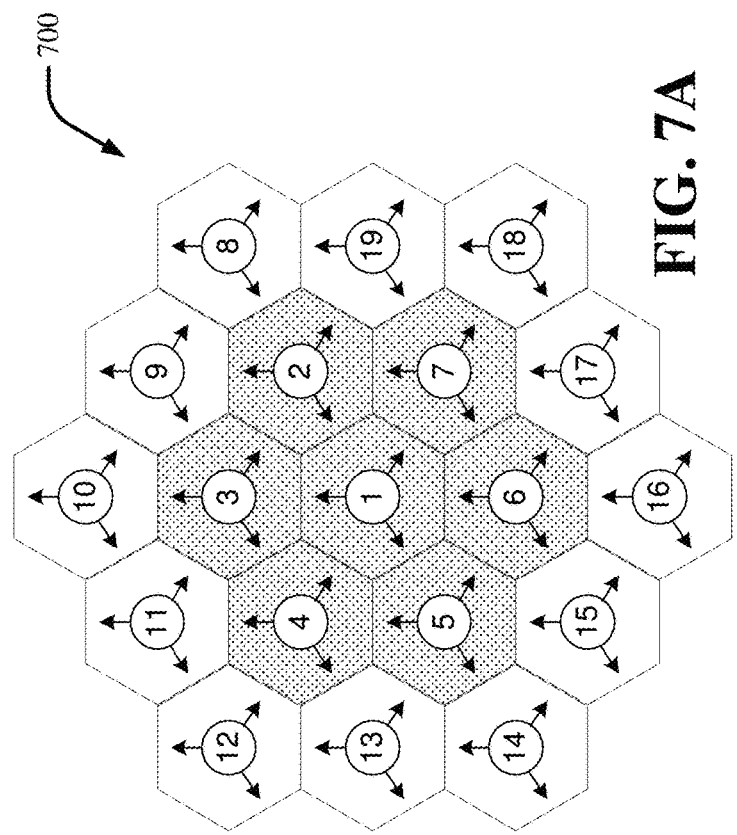
FIG. 7A illustrates a non-limiting example of TRP configuration in accordance with various aspects and embodiments of the subject disclosure.
FIG. 7B illustrates a non-limiting example of a report configuration utilized for providing feedback positioning measurements in accordance with various aspects and embodiments of the subject disclosure.
Figure 8:
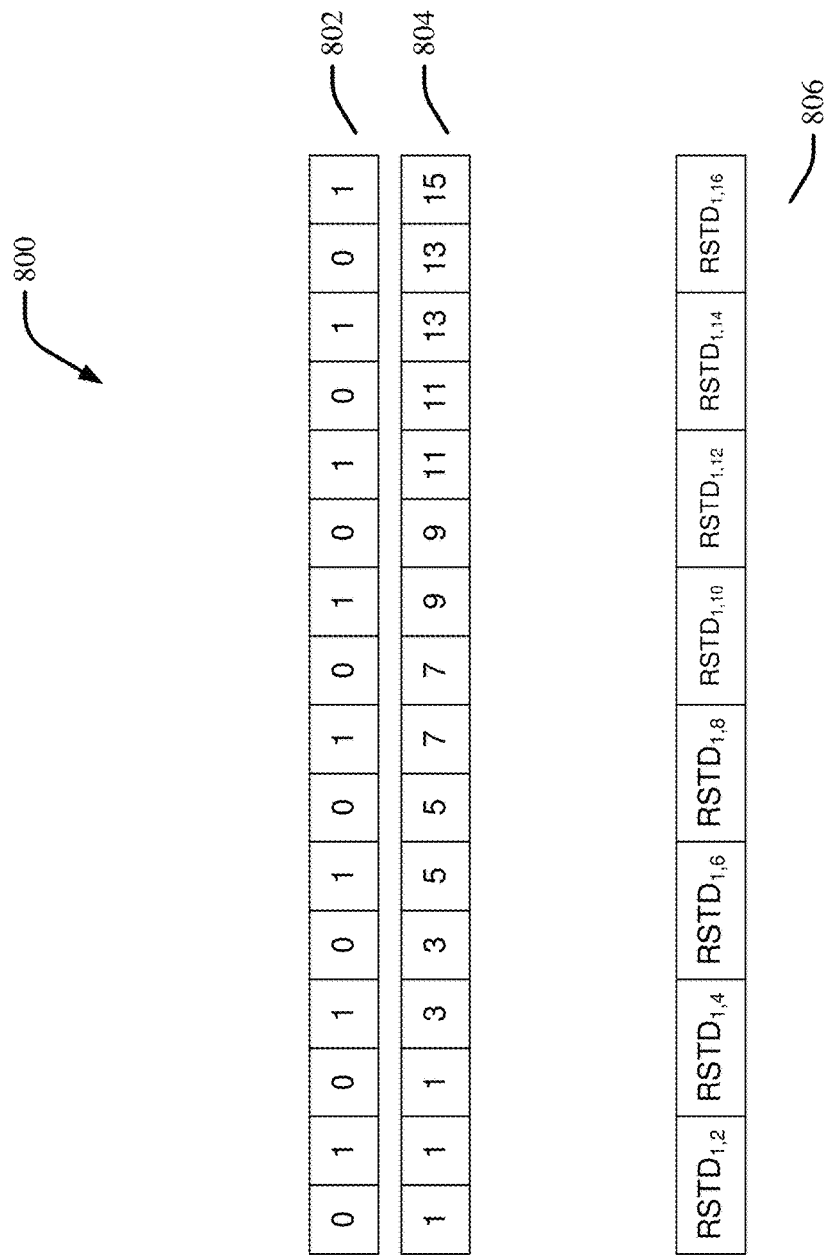
FIG. 8 illustrates a non-limiting example of a report configuration utilized for providing feedback positioning measurements in accordance with various aspects and embodiments of the subject disclosure.

FIG. 7A illustrates a non-limiting example of TRP configuration 700 and FIG. 7B illustrates a non-limiting example of a report configuration 750 utilized for providing feedback positioning measurements in accordance with various aspects and embodiments of the subject disclosure. According to another embodiment, as illustrated in FIG. 7A, a 19-cell layout where each cell has an omni-direction antenna (in other words, one PRS resource per cell). It is assumed the target UE is inside the coverage of cell 1 and is configured to measure all 19 PRS resources. After the measurement of TOA of all PRS transmissions, the UE may select a reference PRS resource or PRS resource set so that the RSTD results may be grouped together in order to save reporting overhead. For instance, the UE may select PRS resource 1 (from cell 1) as the reference. After calculation, if the difference between a pair of RSTDs is smaller than a threshold 6, the UE may group that pair of RSTD results together. For example, the values of $RSTD_{2,1}$, $RSTD_{3,1}$, $RSTD_{4,1}$, $RSTD_{5,1}$, $RSTD_{6,1}$, and $RSTD_{7,1}$ may be close to be selected as group 1; while $RSTD_{8,1}$, $RSTD_{19,1}$ may also be close to be selected as group 2. Instead of reporting 18 RSTD values, the UE may generate 3 strings along with some RSTD results as the following FIG. 7B. The first string 752 is of 19 bits indicating whether TOA of all 19 PRS resources are measured (with bit '1') or not (with bit '0'). The second string 754 whose value indicates the reference PRS resource index used in RSTD calculation. The third string 756 of 18 bits indicating the reported RSTDs are corresponding to PRS resource 2 and 8, respectively (e.g. $RSTD_{2,1}$ and $RSTD_{8,1}$ are reported) with respect to reference PRS resource 1. In the third string, the ith bit indicates an RSTD report corresponding to PRS resource i with respect to the reference PRS resource. Bit '1' indicating the actual RSTD is reported while bit '0' indicates that the RSTD is the same as that of the first bit in descend order with non-zero value. Note that the selection of the reference PRS resource has a great impact on whether the RSTD reports can be grouped or not. For instance, if the UE selects PRS resource 2 (from cell 2) in FIG. 10 as the reference, it may not be able to group RSTD results into two groups. In this case, more than two groups and hence more than two RSTD reports will be reported. Also, note that the threshold 6 for RSTD report value comparison can be indicated or pre-configured by the network or chosen by the UE FIG. 8 illustrates a non-limiting example of a report configuration 800 utilized for providing feedback positioning measurements in accordance with various aspects and embodiments of the subject disclosure. For example, a gNB may sweep its' PRS transmission beams to identify the beam(s) of the strongest signal quality at the UE. The gNB may have 16 beams of PRS transmission configured as PRS resource set 1. The network may select PRS beam 1 which may be the beam with strongest SINR as the reference for RSTD calculation which may in turn result into 15 RSTD reports from a UE. Instead, the UE may choose a set of PRS resources (corresponding to PRS transmission beams) as the possible reference for RSTD calculation. For instance, the UE may select a set of 8 PRS resources S={1, 3, 5, 7, 9, 11, 13 15} as the possible reference. After measuring all TOAs for PRS resources, the UE can calculate all possible RSTD values based on each possible reference PRS resource. For example, 15 RSTD values assuming PRS resource 1 as the reference, 15 RSTD values assuming PRS resource 3, and so on. In this example, a total of 15×8 possible RSTD values. Since it's for beam sweeping, the UE may be required to report RSTD information related to each beam. Then the UE can select one or more PRS beam(s) from the possible set S as the actual reference such that the number of distinguishable RSTD (relative difference <=a threshold ε) is minimized under the condition that the information related to at least one RSTD report for each PRS beams should be included. An example report comprising 2 strings along with some RSTD results as the following FIG. 8. The first string 802 of size 16 indicates whether the RSTD between the PRS resource and a reference PRS resource is reported (with bit '1') or not (with bit '0'). Furthermore, it is also assumed that when RSTD for PRS resource i is not reported, then the RSTD is the same as that of PRS resource i-1. For each bit in the first bitmap, a string where each element's value indicates the PRS resource index used as the reference for the corresponding RSTD calculation is generated. Note that the second string 804 can be mapped into a bit string as well where each element is mapped according to Table 2.

In the example $RSTD_{1,2}$ and $RSTD_{1,3}$ are of the same value so that only RSTD1,2 is reported; and so on (e.g., map 806).

TABLE 2

| PRS resource used as the reference for RSTD | Bit string |
|---|---|
| 1 | 000 |
| 3 | 001 |
| 5 | 010 |
| 7 | 011 |
| 9 | 100 |
| 11 | 101 |
| 13 | 110 |
| 15 | 111 |

According to yet another embodiment, the format used for a positioning report can be selected by the network or the UE. In either case, a signaling which format is used is indicated to the other side so that the network and the UE have the same assumption of which format is used. The principle of selecting some reference PRS resource(s) and generating string(s) or bitmap(s) to indicate which PRS resource(s) the RSTD report(s) is(are) corresponding to can be extended to other types of positioning report, for example, Angle-Of-Arrival.

The advantage is that several formats can be utilized for the UE to generate some indication (e.g., string or bitmap) along with positioning resource measurement reports in order to save some reporting overhead. A threshold can be utilized to control whether and how much positioning resource measurement report can be compressed. The UE and/or the network may select the reference PRS resource and/or PRS resource set accordingly in order for the UE to save reporting overhead. When the UE selects a different reference PRS resource other than the one from the network positioning configuration, the UE reports the actual used PRS resource index to the network.

Figure 9:
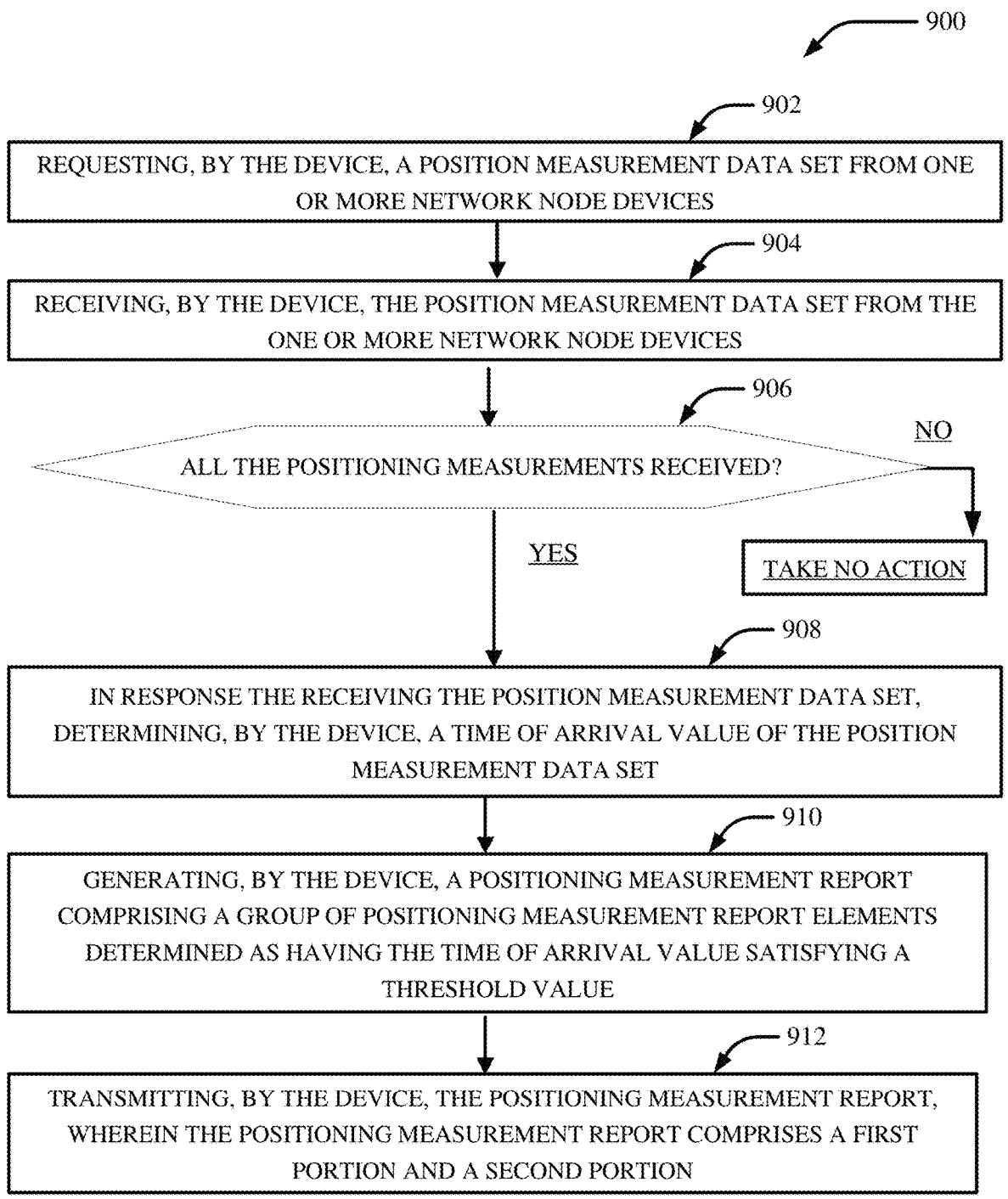
FIG. 9 depicts a diagram of an example, non-limiting computer implemented method that facilitates management of background data traffic in accordance with one or more embodiments described herein.

FIG. 9 depicts a diagram of an example, non-limiting computer implemented method that facilitates management of background data traffic in accordance with one or more embodiments described herein. In some examples, flow diagram 900 can be implemented by operating environment 1400 described below. It can be appreciated that the operations of flow diagram 900 can be implemented in a different order than is depicted.

In non-limiting example embodiments, a computing device (or system) (e.g., computer 1404) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts requesting, by a processor of a device, a positioning measurement data set from one or more network node devices. Operation 904 depicts receiving, by the device, the positioning measurement data set from the one or more network node devices. Operation 906 depicts, by the device, determining, by the device, if all the positioning measurements have been received. If all the positioning measurements have been received, then perform operation 908. Otherwise, take no action and continue monitoring. Operation 908 depicts in response the receiving the positioning measurement data set, determining, by the device, a time of arrival value of the positioning measurement data set. Operation 910 depicts generating, by the device, a positioning measurement report comprising a group of positioning measurement report elements determined as having the time of arrival value satisfying a threshold value. Operation 912 depicts transmitting, by the device, the positioning measurement report, wherein the positioning measurement report comprises a first portion and a second portion.

Figure 10:
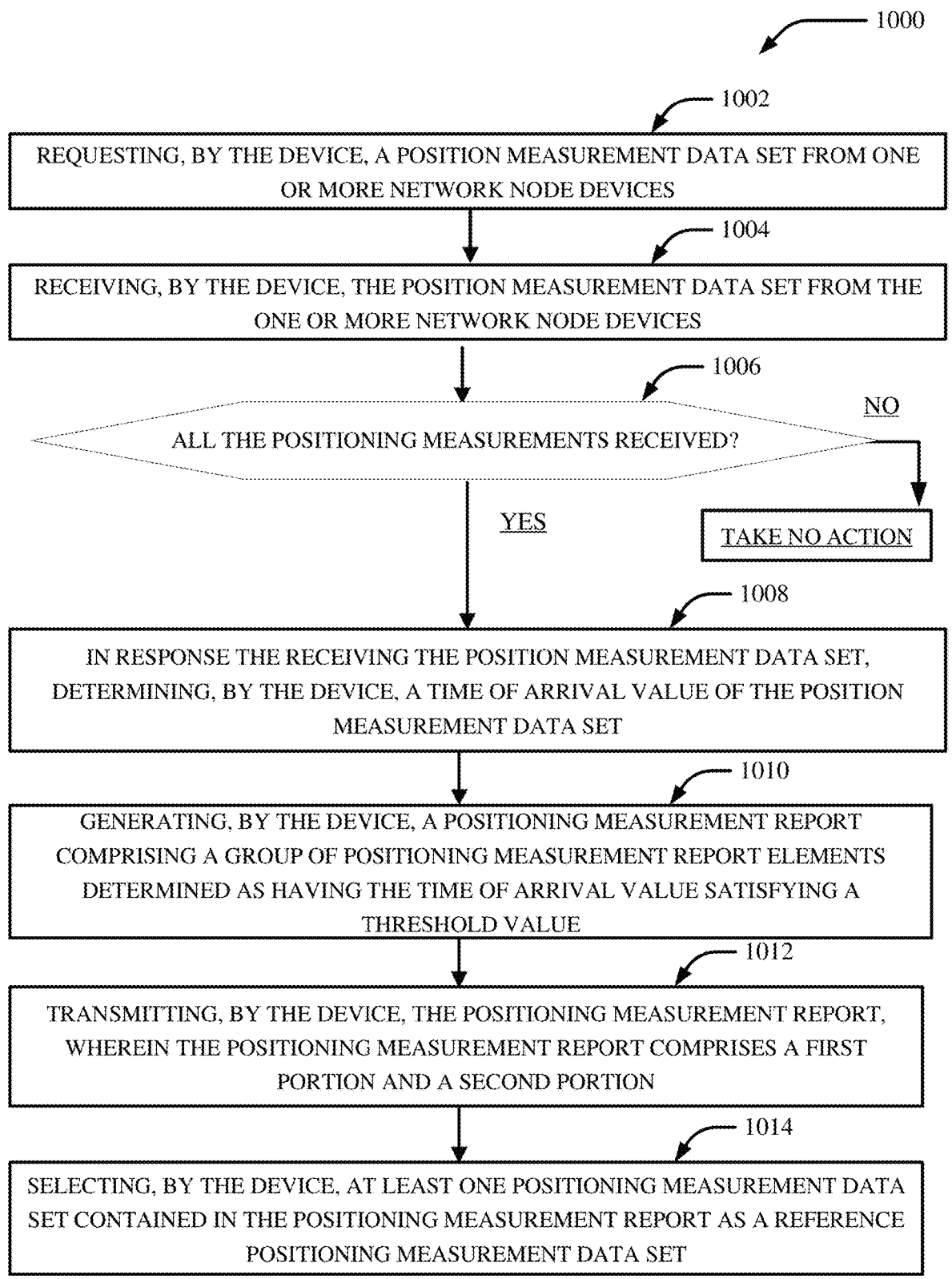
FIG. 10 depicts a diagram of an example, non-limiting computer implemented method that facilitates management of background data traffic in accordance with one or more embodiments described herein.

FIG. 10 depicts a diagram of an example, non-limiting computer implemented method that facilitates management of background data traffic in accordance with one or more embodiments described herein. In some examples, flow diagram 1000 can be implemented by operating environment 1400 described below. It can be appreciated that the operations of flow diagram 1000 can be implemented in a different order than is depicted.

In non-limiting example embodiments, a computing device (or system) (e.g., computer 1404) is provided, the device or system comprising one or more processors and one or more memories that stores executable instructions that, when executed by the one or more processors, can facilitate performance of the operations as described herein, including the non-limiting methods as illustrated in the flow diagrams of FIG. 10.

Operation 1002 depicts requesting, by a processor of a device, a positioning measurement data set from one or more network node devices. Operation 1004 depicts receiving, by the device, the positioning measurement data set from the one or more network node devices. Operation 1006 depicts, by the device, determining, by the device, if all the positioning measurements have been received. If all the positioning measurements have been received, then perform operation 1008. Otherwise, take no action and continue monitoring. Operation 1008 depicts in response the receiving the positioning measurement data set, determining, by the device, a time of arrival value of the positioning measurement data set. Operation 1010 depicts generating, by the device, a positioning measurement report comprising a group of positioning measurement report elements determined as having the time of arrival value satisfying a threshold value. Operation 1012 depicts transmitting, by the device, the positioning measurement report, wherein the positioning measurement report comprises a first portion and a second portion. Operation 1014 depicts selecting, by the device, at least one positioning measurement data set contained in the positioning measurement report as a reference positioning measurement data set.

Figure 11:
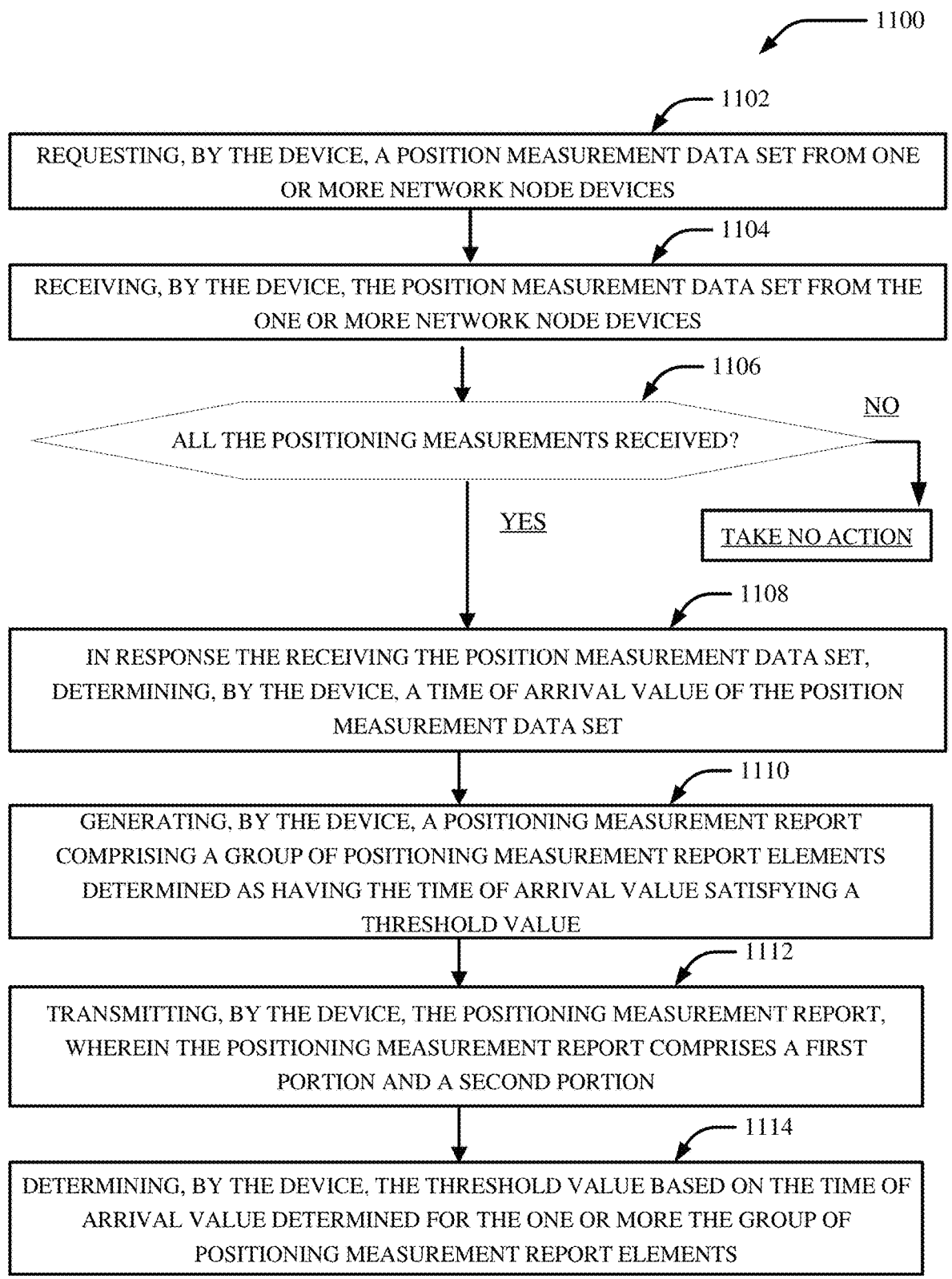
FIG. 11 depicts a diagram of an example, non-limiting computer implemented method that facilitates management of background data traffic in accordance with one or more embodiments described herein.

FIG. 11 depicts a diagram of an example, non-limiting computer implemented method that facilitates management of background data traffic in accordance with one or more embodiments described herein. In some examples, flow diagram 1100 can be implemented by operating environment 1400 described below. It can be appreciated that the operations of flow diagram 1100 can be implemented in a different order than is depicted.

In non-limiting example embodiments, a computing device (or system) (e.g., computer 1404) is provided, the device or system comprising one or more processors and one or more memories that stores executable instructions that, when executed by the one or more processors, can facilitate performance of the operations as described herein, including the non-limiting methods as illustrated in the flow diagrams of FIG. 11.

Operation 1102 depicts requesting, by a processor of a device, a positioning measurement data set from one or more network node devices. Operation 1104 depicts receiving, by the device, the positioning measurement data set from the one or more network node devices. Operation 1106 depicts, by the device, determining, by the device, if all the positioning measurements have been received. If all the positioning measurements have been received, then perform operation 1108. Otherwise, take no action and continue monitoring. Operation 1108 depicts in response the receiving the positioning measurement data set, determining, by the device, a time of arrival value of the positioning measurement data set. Operation 1110 depicts generating, by the device, a positioning measurement report comprising a group of positioning measurement report elements determined as having the time of arrival value satisfying a threshold value. Operation 1112 depicts transmitting, by the device, the positioning measurement report, wherein the positioning measurement report comprises a first portion and a second portion. Operation 1114 depicts determining, by the device, the threshold value based on the time of arrival value determined for the one or more the group of positioning measurement report elements.

Figure 12:
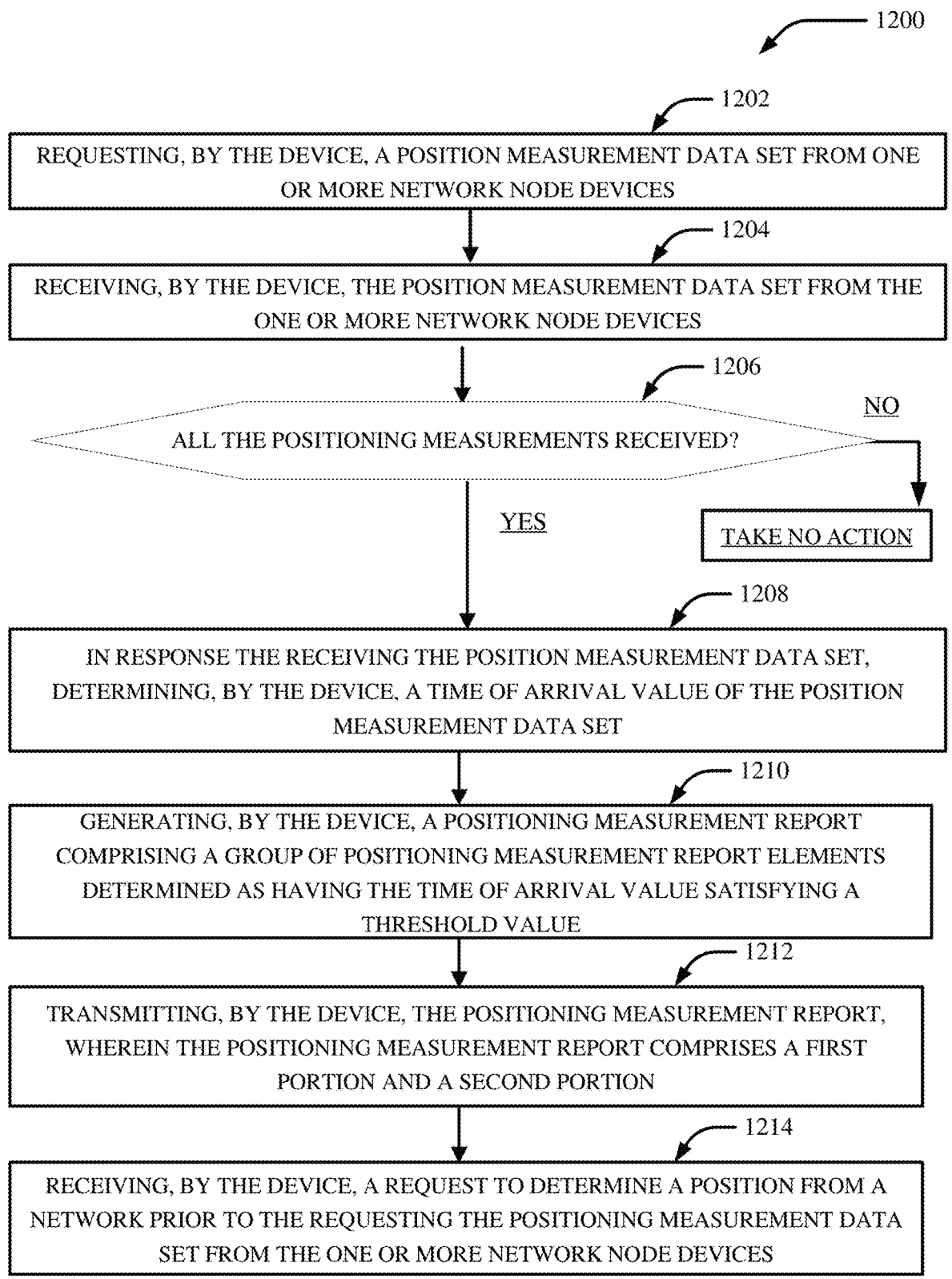
FIG. 12 depicts a diagram of an example, non-limiting computer implemented method that facilitates management of background data traffic in accordance with one or more embodiments described herein.

FIG. 12 depicts a diagram of an example, non-limiting computer implemented method that facilitates management of background data traffic in accordance with one or more embodiments described herein. In some examples, flow diagram 1200 can be implemented by operating environment 1400 described below. It can be appreciated that the operations of flow diagram 1200 can be implemented in a different order than is depicted.

In non-limiting example embodiments, a computing device (or system) (e.g., computer 1404) is provided, the device or system comprising one or more processors and one or more memories that stores executable instructions that, when executed by the one or more processors, can facilitate performance of the operations as described herein, including the non-limiting methods as illustrated in the flow diagrams of FIG. 12.

Operation 1202 depicts requesting, by a processor of a device, a positioning measurement data set from one or more network node devices. Operation 1204 depicts receiving, by the device, the positioning measurement data set from the one or more network node devices. Operation 1206 depicts, by the device, determining, by the device, if all the positioning measurements have been received. If all the positioning measurements have been received, then perform operation 1208. Otherwise, take no action and continue monitoring. Operation 1208 depicts in response the receiving the positioning measurement data set, determining, by the device, a time of arrival value of the positioning measurement data set. Operation 1210 depicts generating, by the device, a positioning measurement report comprising a group of positioning measurement report elements determined as having the time of arrival value satisfying a threshold value. Operation 1212 depicts transmitting, by the device, the positioning measurement report, wherein the positioning measurement report comprises a first portion and a second portion. Operation 1214 depicts receiving, by the device, a request to determine a position from a network prior to the requesting the positioning measurement data set from the one or more network node devices.

Figure 13:
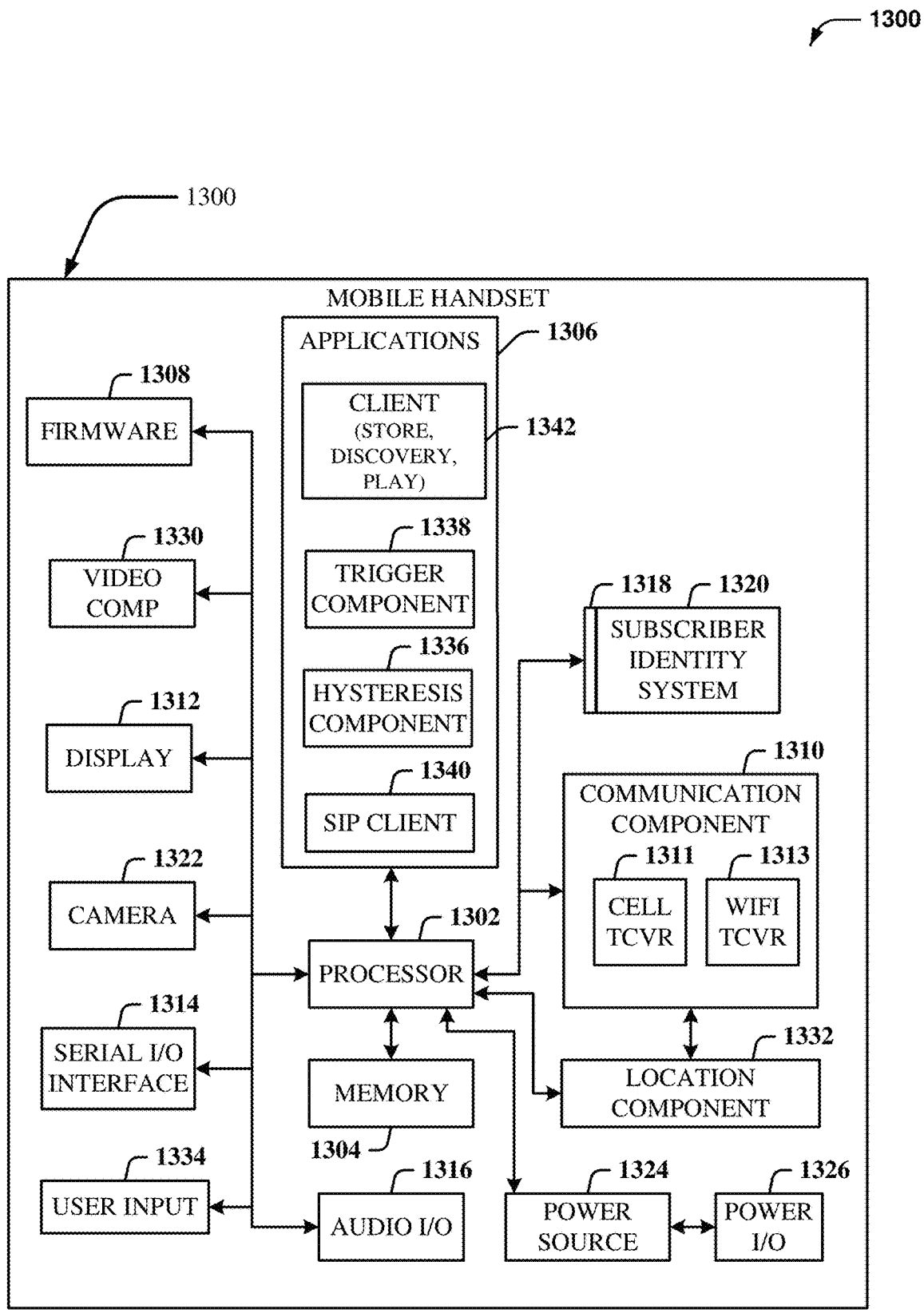
FIG. 13 illustrates an example block diagram of an example mobile handset operable to engage in a system architecture that facilitates wireless communications according to one or more embodiments described herein.

Referring now to FIG. 13, illustrated is an example block diagram of an example mobile handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals.

The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touchscreen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
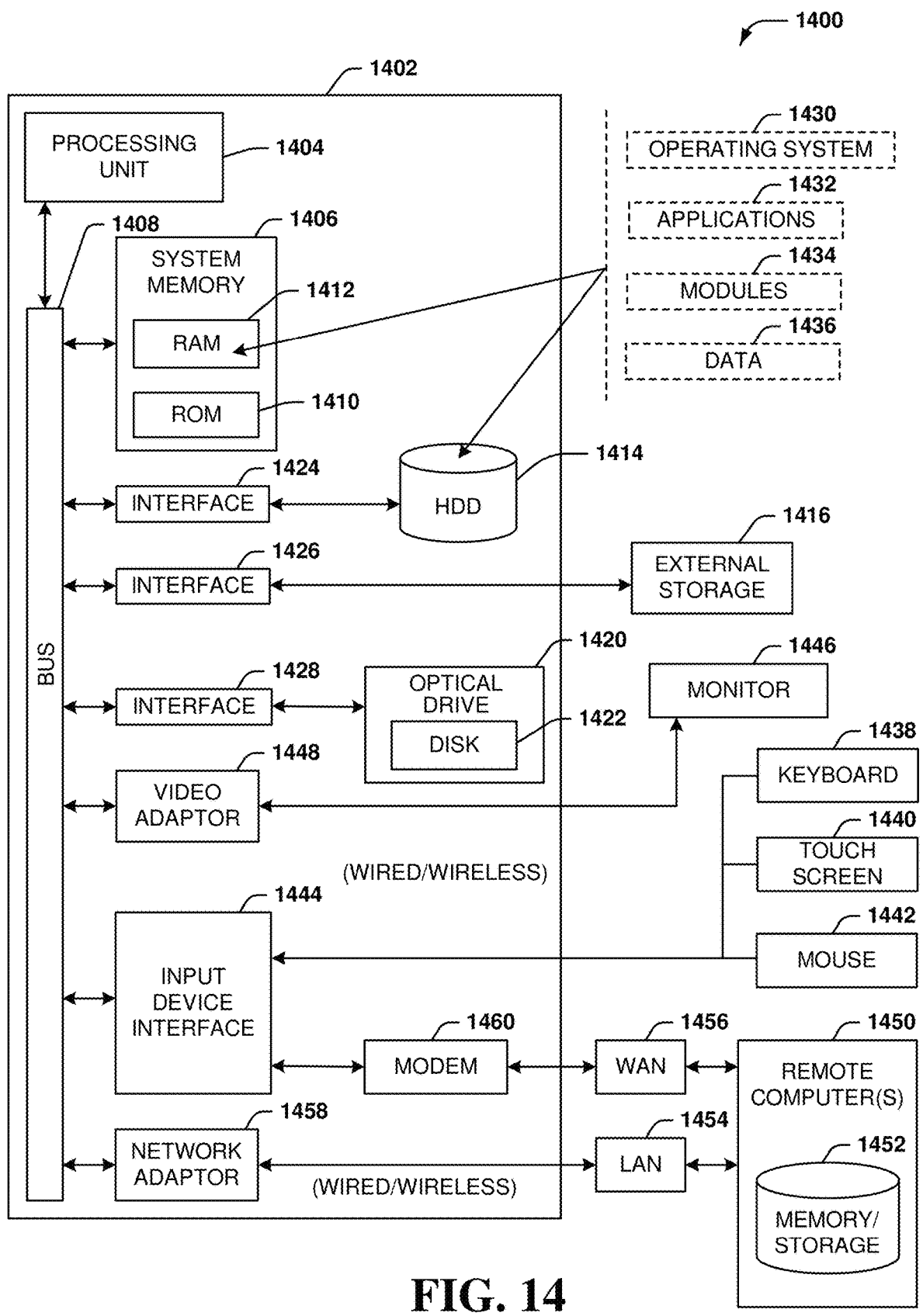
FIG. 14 illustrates an example block diagram of an example computer operable to engage in a system architecture that facilitates secure wireless communication according to one or more embodiments described herein.

Referring now to FIG. 14, illustrated is an example block diagram of an example computer 1400 operable to engage in a system architecture that facilitates wireless communications according to one or more embodiments described herein. The computer 1400 can provide networking and communication capabilities between a wired or wireless communication network and a server and/or communication device.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather are to be construed in breadth, spirit and scope in accordance with the appended claims.

What is claimed is:

1. A system, comprising:
  a processor; and
  a memory that stores executable instructions that, when executed by the processor, facilitate performance of operations, comprising:
    receiving one or more positioning measurement data sets respectively associated with one or more network node devices, wherein the one or more positioning measurement data sets comprise respective positioning measurement data associated with communication resources;
    determining time of arrival values for the respective positioning measurement data of the one or more positioning measurement data sets;
    generating a positioning measurement report comprising a group of positioning measurement report elements determined as having respective time of arrival values satisfying a threshold value; and
    transmitting the positioning measurement report, wherein the positioning measurement report comprises a first portion and a second portion, wherein the first portion comprises a respective bit for the one or more positioning measurement data sets, where the bit in the first portion associated with a positioning measurement data set indicates whether a quantity of positioning measurement report elements for the positioning measurement data set in the second portion is greater than one.

2. The system of claim 1, wherein the one or more positioning measurement data sets comprises a group of positioning measurement data sets.

3. The system of claim 2, wherein the first portion of the positioning measurement report comprises a group of bits indicating whether respective quantities of positioning measurement report elements for the group of positioning measurement data sets in the second portion is greater than one.

4. The system of claim 1, wherein the threshold value is a first threshold value, and the positioning measurement report, in response to the bit in the first portion associated with the positioning measurement data set indicating that the quantity of positioning measurement report elements for the positioning measurement data set in the second portion is greater than one, further comprises, a third portion comprising a group of bits indicating the quantity of positioning measurement report elements for the positioning measurement data set in the second portion based on at least two of the time of arrival values for the respective positioning measurement data of the positioning measurement data set having a difference that satisfies a second threshold value.

5. The system of claim 1, wherein the positioning measurement report further comprises a bitmap with respective bits associated with the respective positioning measurement data associated with communication resources indicating whether measurement was performed based on respective positioning measurement data.

6. The system of claim 1, wherein the operations further comprise:
  selecting at least one positioning measurement data set as a reference for generating the group of positioning measurement report elements.

7. The system of claim 1, wherein the operations further comprise:
  determining the threshold value based on the time of arrival values determined for the respective positioning measurement data.

8. The system of claim 1, wherein the operations further comprise:
  receiving a request to determine a position from a network.

9. The system of claim 1, wherein the operations further comprise:
  requesting the one or more positioning measurement data sets from the one or more network node devices.

10. A method, comprising:
  receiving, by a processor of a device, one or more positioning measurement data sets respectively associated with one or more network node devices, wherein the one or more positioning measurement data sets comprise respective positioning measurement data associated with communication resources;
  determining, by the device, time of arrival values for the respective positioning measurement data of the one or more positioning measurement data sets;
  generating, by the device, a positioning measurement report comprising a group of positioning measurement report elements determined as having respective time of arrival values satisfying a threshold value; and
  transmitting the positioning measurement report, wherein the positioning measurement report comprises a first portion and a second portion, wherein the first portion comprises a respective bit for the one or more positioning measurement data sets, where the bit in the first portion associated with a positioning measurement data set indicates whether a quantity of positioning measurement report elements for the positioning measurement data set in the second portion is greater than one.

11. The method of claim 10, wherein the one or more positioning measurement data sets comprises group of positioning measurement data sets.

12. The method of claim 11, wherein the first portion of the positioning measurement report comprises a group of bits a indicating whether respective quantities of positioning measurement report elements for the group of positioning measurement data sets in the second portion is greater than one.

13. The method of claim 10, wherein the threshold value is a first threshold value, and the positioning measurement report, in response to the bit in the first portion associated with the positioning measurement data set indicating that the quantity of positioning measurement report elements for the positioning measurement data set in the second portion is greater than one, further comprises, a third portion comprising a group of bits indicating the quantity of positioning measurement report elements for the positioning measurement data set in the second portion based on at least two of the time of arrival values for the respective positioning measurement data of the positioning measurement data set having a difference that satisfies a second threshold value.

14. The method of claim 10, further comprising:
selecting, by the device, at least one positioning measurement data set as a reference positioning measurement data set.

15. The method of claim 10, further comprising:
determining, by the device, the threshold value based on the time of arrival values determined for the positioning measurement data sets.

16. The method of claim 10, further comprising:
requesting, by the device, the one or more positioning measurement data sets from the one or more network node devices.

17. A non-transitory machine-readable medium, comprising executable instructions that, when executed by a processor, facilitate performance of operations, comprising:
receiving one or more positioning measurement data sets respectively associated with one or more network node devices, wherein the one or more positioning measurement data sets comprise respective positioning measurement data associated with communication resources;
determining time of arrival values for the respective positioning measurement data of the one or more positioning measurement data sets;
generating a positioning measurement report comprising a group of positioning measurement report elements determined as having respective time of arrival values satisfying a threshold value; and
transmitting the positioning measurement report, wherein the positioning measurement report comprises a first portion and a second portion, wherein the first portion comprises a respective bit for the one or more positioning measurement data sets, where the bit in the first portion associated with a positioning measurement data set indicates whether a quantity of positioning measurement report elements for the positioning measurement data set in the second portion is greater than one.

18. The non-transitory machine-readable medium of claim 17, wherein the one or more positioning measurement data sets comprises a group of positioning measurement data sets.

19. The non-transitory machine-readable medium of claim 18, wherein the first portion of the positioning measurement report comprises a group of bits indicating whether respective quantities of positioning measurement report elements for the group of positioning measurement data sets in the second portion is greater than one.

20. The non-transitory machine-readable medium of claim 17, wherein the threshold value is a first threshold value, and the positioning measurement report, in response to the bit in the first portion associated with the positioning measurement data set indicating that the quantity of positioning measurement report elements for the positioning measurement data set in the second portion is greater than one, further comprises, a third portion comprising a group of bits indicating the quantity of positioning measurement report elements for the positioning measurement data set in the second portion based on at least two of the time of arrival values for the respective positioning measurement data of the positioning measurement data set having a difference that satisfies a second threshold value.

* * * * *